UNITED STATES PATENT OFFICE.

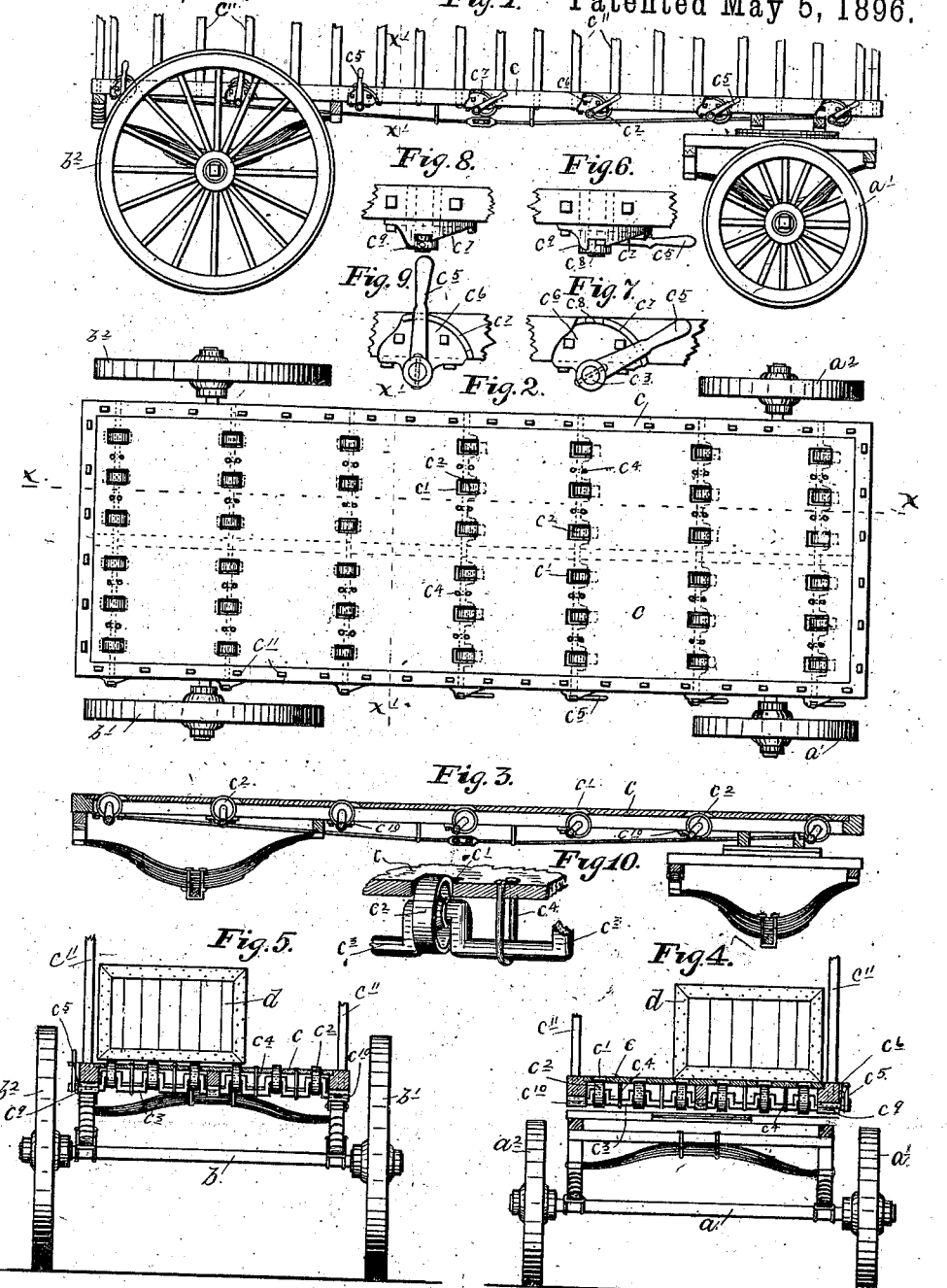

EDWARD H. TURNER, OF MINNEAPOLIS, MINNESOTA, ASSIGNOR TO JOHN S. KEARNEY, OF SAME PLACE.

TRUCK-PLATFORM FOR HANDLING HEAVY ARTICLES.

SPECIFICATION forming part of Letters Patent No. 559,552, dated May 5, 1896.

Application filed January 18, 1896. Serial No. 535,377. (No model.)

*To all whom it may concern:*

Be it known that I, EDWARD H. TURNER, a citizen of the United States, residing at Minneapolis, in the county of Hennepin and State of Minnesota, have invented certain new and useful Improvements in Truck-Platforms or other Supports for Handling Heavy Articles; and I do hereby declare the following to be a full, clear, and exact description of the invention, such as will enable others skilled in the art to which it appertains to make and use the same.

My invention has for its object to provide an improved construction for handling heavy articles on drays, platforms, or other supports.

To this end my invention comprises the novel devices and combination of devices hereinafter described, and defined in the claims.

The invention is illustrated in the accompanying drawings, wherein like letters refer to like parts.

Figure 1 is a side elevation of a truck or dray embodying my improvement, with some parts broken away and others removed. Fig. 2 is a plan view of the same with some parts removed. Fig. 3 is a longitudinal section on the line X X of Fig. 2. Fig. 4 is a vertical transverse section on the line X' X' of Figs. 1 and 2, looking toward the front, showing a box as supported by the non-rotary bearing-surfaces of the truck-body. Fig. 5 is a similar view on the same line, but looking toward the rear, with one of the boxes shown as raised onto and sustained by the rotary bearing-surfaces of the truck body or support. Figs. 6 and 7 are details in plan view and end elevation, respectively, showing the devices for manipulating the rollers with the rollers assumed to be in their lowermost position. Figs. 8 and 9 are similar views of the same parts as they would appear when the rollers are in their raised or uppermost position. Fig. 10 is a detail, partly in section and partly in perspective, showing the relation of the crankshaft and rollers to one of the inside hangers for upholding the shaft.

$a\, a'\, a^2$, &c., represent, respectively, the axle-wheels and other portions of the front part of the truck underneath the truck body or platform $c$, and $b\, b'\, b^2$, &c., represent the rear axle, rear wheels, and other rear parts of the truck underneath the truck body or platform $c$. The said running-gear parts of the truck or dray may be of the ordinary or other suitable construction.

The truck body or platform $c$ is provided with openings or passages $c'$ for rollers $c^2$, which are mounted, as shown, on the crank portions of crank-shafts $c^3$, which are journaled in the side bars of the truck-body and are further supported by hangers $c^4$, depending from the truck-body between the side bars and embracing the crank-shaft. The crank-shafts $c^3$ project at one end beyond the side bar of the truck and are provided with hand-levers $c^5$ for rocking the said shafts to throw the rollers $c^2$ from a point below to a point above the plane of the face of the truck-body through the passages $c'$. Plates $c^6$, with cam-surfaces $c^7$ and notches $c^8$, are bolted to the side bar of the truck-body, so as to face the hand-levers and the crank-shafts in position to hold the rollers at their uppermost level. The hand-levers $c^5$ are intended to be made of spring metal and to bear against the inclined cam-surfaces $c^7$ when being turned into their uppermost position, so as to spring into the lock-notches $c^8$ on reaching the same. As shown, the castings $c^6$ are formed integral with the boxes $c^9$, which form the bearing for the handle ends of the crank-shafts $c^3$. The opposite ends of said crank-shafts $c^3$ are journaled in ordinary bearings $c^{10}$, bolted to the side bar of the truck body or platform. As shown, each crank-shaft $c^3$ is provided with six rollers $c^2$, which may work through six corresponding passages or openings $c'$ in the truck bed or platform, and seven of the said crank-shafts are shown as equally spaced apart in different positions on the truck-body. A sufficient number of rollers should be provided for each shaft to enable two or more articles to be supported side by side and to be moved one without interference with the other. To accomplish this, it is necessary that at least four rollers should be provided for each shaft, for, as is evident, it will take two rollers spaced apart sidewise to support one article.

With the foregoing construction it is obvious that the face of the truck body or platform is always available as a non-rotary or plain bearing-surface for the boxes or packages or other heavy articles $d$, and that the rollers $c^2$ on the crank-shafts $c^3$ are always available as rotary bearing-surfaces for the said boxes, packages, or other articles. Hence the boxes may be either permitted to rest on the non-rotary bearing-surfaces of the truck-body, as shown in Fig. 4, or be raised onto the rotary bearing-surfaces or rollers $c^2$, as shown in Fig. 5. The normal position of the said articles $d$ would be on the non-rotary bearing-surfaces, as shown in Fig. 4, supposing it be desired to have the box or article remain stationary on the truck body or platform—as, for example, when transporting the same—and the said articles would be raised into the position shown in Fig. 5 or onto the rollers $c^2$ whenever it is desired to move the articles lengthwise of the truck body or platform—as, for example, when loading or unloading the same. Otherwise stated, the roller-bearings are mounted so as to be adjustable through the normal and non-rotary bearing-plane of the truck-body or other support, so as to be always available when desired for the purposes of shifting the articles.

The platform or body $c$ is shown as mounted on wheels and running-gear for service as an ordinary dray or truck; but it will be understood, of course, that it might be a stationary platform for receiving or shipping goods, or the floor of a building, such as a wareroom, over which it is desired to move heavy articles.

The truck-body $c$ has removable standards $c^{11}$.

What I claim, and desire to secure by Letters Patent of the United States, is as follows:

1. The combination with a plane surface for the support of heavy articles, of crank-shafts underlying said support, formed each by a series of crank-sections (four or more) and a corresponding series of rollers mounted directly on said crank-sections, which by turning said shaft, are adjustable through the bearing-face of said support, whereby two or more articles may be supported, side by side, on said rollers and be moved without interference with each other, substantially as described.

2. The combination with the truck-body $c$ having roller-passages $c'$, of the crank-shafts $c^3$ having the rollers $c^2$, the hand-levers $c^5$ and the lock-segments $c^6$ with cam-surfaces $c^7$ and notches $c^8$, all arranged and operating substantially as described.

In testimony whereof I affix my signature in presence of two witnesses.

EDWARD H. TURNER.

Witnesses:
J. S. KEARNEY,
JAS. F. WILLIAMSON.